March 7, 1967 C. E. MURCOTT 3,307,872
SUPPORT BELT
Filed April 25, 1966
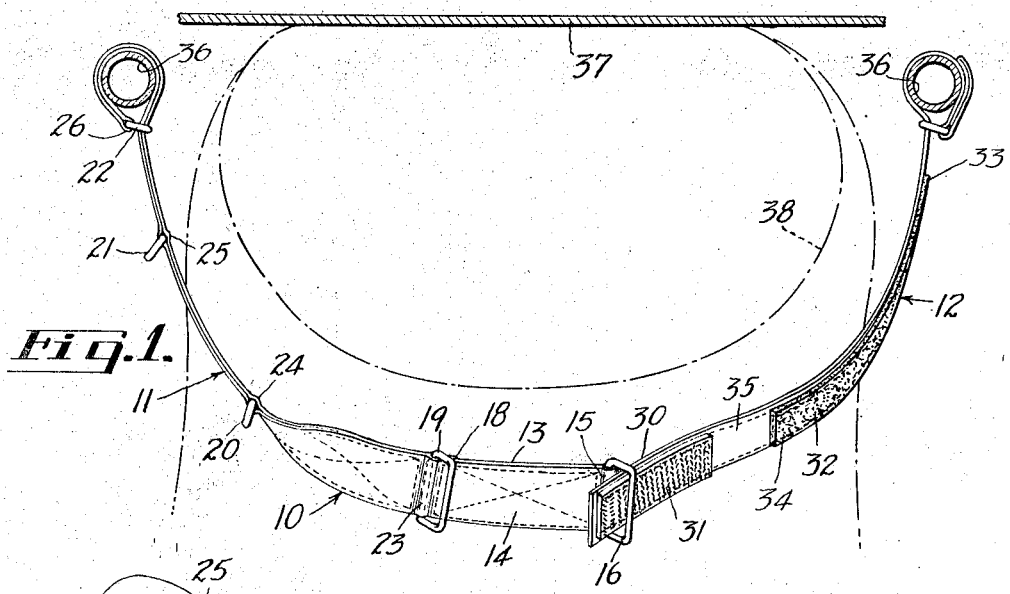
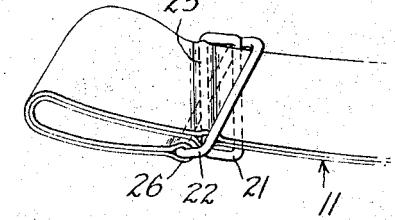
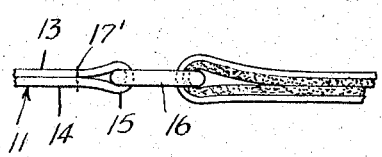
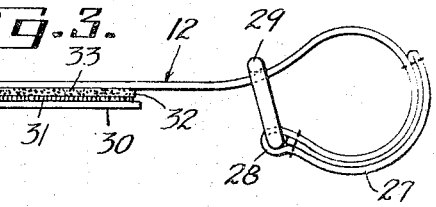
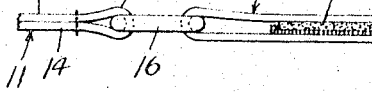
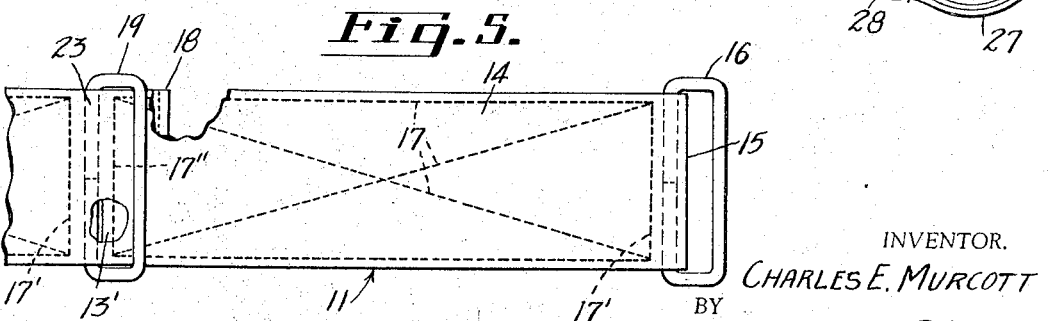
INVENTOR.
CHARLES E. MURCOTT
BY
Howard C. Thompson
ATTORNEY ated Mar. 7, 1967

3,307,872
SUPPORT BELT
Charles E. Murcott, Valley Drive, Bay Crest,
Huntington, N.Y. 11743
Filed Apr. 25, 1966, Ser. No. 544,986
10 Claims. (Cl. 297—385)

This invention relates to support belts adapted for use on wheelchairs, straight-back chairs, stretchers, treatment tables and the like. More particularly, the invention deals with a two part belt structure, each part having means for coupling with a suitable support, one part comprising the coupling part and the other part comprising the adjustment part, with which the coupling part is adjustably coupled in connection with a series of coupling loops spaced longitudinally of the adjustment part in adapting the belt for support of individuals of different sizes and as well as apparatus, in connection with which the individual is positioned.

Still more particularly, the invention deals with a support belt of the character defined, which is capable of being applied and released by an individual or the person attending the individual and, wherein, the belt is preferably made of a color readily identifiable in facilitating quick release as and when required. The support belt further is so constructed as to eliminate any type of element which would be injurious to a patient or create problems in connection with apparatus with which the belt is coupled.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional and perspective view illustrating coupling or uncoupling of a belt in support or release of a patient, the patient being indicated in dot-dash lines.

FIG. 2 is a detailed perspective view diagrammatically illustrating the passage of one loop through another loop in controlling the length of the adjustable part of the belt.

FIG. 3 is a detailed edge view of primarily the coupling part of the belt showing said coupling part in its shortest coupling position and illustrating the structure of one end of the webbing for support of the loop of said part.

FIG. 4 is a view, identical to FIG. 3, showing the coupling part in its longest coupling position; and FIG. 5 is a face view of one end portion of the adjustable part of the belt, illustrating in more detail the belt ends and stitching of the webbing and in illustrating in broken away portions the ends of the webbing.

The support belt is generally identified by the reference character 10. This belt is formed of two parts, namely an adjustment part 11 and a coupling part 12. Considering primarily FIGS. 1, 2 and 5, it will appear that the belt part 11 is fashioned from a webbing, one end portion of which is seen at 13 in FIGS. 1, 3 and 4, and the terminal end of said end portion is indicated at 13' in the broken away portion of FIG. 5. At 14 is shown an end portion overlying the end portion 13 in forming a coupling station 15 for an end metallic loop 16, preferably formed of chromeplated steel. This structure is best shown in FIGS. 3 and 4 of the drawing, as well as in side elevation in FIG. 5.

In dotted lines at 17 in FIG. 5 is shown the stitching securing the overlying portions 13 and 14 together, as well as a transverse stitching 17' to form the coupling station 15 and a transverse stitching 17" to secure the terminal end 13, not only to the portion 14, but to the other end 18 of the webbing, most clearly illustrated in the broken away portion of FIG. 5. The stitchings at 17, 17' and 17" are carried out throughout the length of the belt part 11 between other loops, such as the loop 19, the loop 20, end loop 21 and the end loop 22, as noted in FIG. 1 of the drawing.

Now, turning to FIG. 5 of the drawing, the transverse stitching 17', similar to the first named stitching 17', is spaced with respect to the stitching 17" to form a coupling station 23 for the loop 19. As these structures are the same throughout, the various stitchings will not be described. However, the other stations, similar to 15 and 23, are identified by the reference characters 24, 25 and 26 in FIG. 1 of the drawing. In other words, the loop coupling station, as at 26, defines the fold in the webbing and the overall length of the adjustment part 11 from the loop 16 to the loop 22.

Turning now to the coupling part 12 of the belt, clearly shown in edge elevation in FIGS. 3 and 4, the webbing forming this part has one fashioned and secured end 27, as clearly illustrated at the right of FIGS. 3 and 4. This forms a reinforced end, including a coupling station 28 for the support of a loop 29, generally similar to the loops 16 and 19 to 22. Suitably secured to one surface of the other end portion 30 of the webbing forming the part 12 and for a predetermined length on said end portion is the male part or element 31 of what is well-known as a Velcro closure. The male part of this closure is relatively short with respect to the considerably longer female part or element 32 of the closure arranged on the same surface of the webbing. One end portion of the part 32 is clearly seen at 33 in FIG. 3 and the other end portion is clearly seen at 34 in FIG. 4 of the drawing. These relative lengths of the parts 31 and 32 are diagrammatically illustrated in FIG. 1 of the drawing and, in said figure, at 35 is seen the space between the parts 31 and 32 on the webbing.

FIG. 3 diagrammatically represents the attachment of the two parts 31 and 32 of the closure or coupling in the shortest adjustment of the coupling part 12 and, in like manner, FIG. 4 illustrates the longest adjustment in the attachment of the two parts 31 and 32. Thus, in addition to other adjustments made possible through the adjustment part 11, there is this final adjustment coupled by the patient or an attendant for the patient in securing 31 to 32 in any position between the two showings of FIGS. 3 and 4 to provide the desired secure support of the patient, as will be apparent.

In the primary adjustment of the belt in connection with predetermined supports such, for example, as the spaced tubes 36 shown in section in FIG. 1, the belt part 12 will be coupled to the righthand tube, as diagrammatically shown. This coupling consists in forming a ring portion engaging the support 36, the ring portion being formed by engagement of the ring 29 with the portion of the webbing adjacent to the fashioned end 27, the atter being a three-ply arrangement of the webbing; whereas, the coupling with the lefthand tube 36 is adjustable and, in the present showing, the attachment of the part 11 shows the full length adjustment of said part. However, it will be apparent that any one of the loops 19, 20 or 21 can assume the position of the loop 22 on the support tube 36 in varying the size adjustment of the overall belt. To accomplish this latter adjustment, keeping in mind that all of the loops are elongated, the loops 21, 20 or 19 are passed through the loop 22, in the manner diagrammatically illustrated in FIG. 2 of the drawing, wherein the loop 21 is being illustrated as passing through the loop 22. In other words, by simply angling the loop 21, it can be freely passed through the loop 22 and this operation would continue until all of the loops 21, 20, 19 and 16 have been passed through the loop 22. Then, after passing the belt part 11 around the support and, for example, assuming that the loop 21 is selected, then the loop 16 is first passed through this loop. Then the loop 19 is passed through 21. Then the loop 20 is passed through the loop 21 and this leaves an end of the part 11, including the loop 22, projecting beyond the loop 21.

If the attachment was made at the loop 20, then the end would comprise the portion of the belt part 11 between 20 and 21 and the end, including the loop 22. If the support engaged by the belt part 11 is relatively large, it is possible that, in the first instance noted above, the loop 20 may terminate adjacent the loop 21 in the coupling engagement with the support, as at 36 at the left of FIG. 1. However, these supports vary in cross-sectional form and this would modify the relative positions of the free end portions of the part 11.

In the diagrammatic illustration of FIG. 1, I have shown, in section at 37, a body support for the patient, which has been diagrammatically shown by the dot-dash lines 38. This support could be the backrest of a wheelchair or straight-back chair or the patient support of a stretcher, treatment table or the like, in connection with which the patient is to be held by the support belt and, with various attachmens, the characteristics of the supports 36 will, of course, be modified.

The webbing employed in forming the two belt parts 11 and 12 is preferably a heavy duty soft cotton and this webbing is produced in a color which would be readily detectable when the belt is worn upon the body of a patient, such as a bright red color. With the belt structure, it will further be apparent that no parts of the belt produce any sharp protruding edges, as would be the condition with buckles and similar types of couplings. Thus, injury to the patient or others having occasion to handle the belt is obviated. Furthermore, there is nothing protruding, which could become entangled in any part of the equipment upon which the patient is arranged, particularly such equipment as a wheelchair, keeping in mind that there may be a dangling end from the belt part 11.

Still further, the type of securing means or closure employed provides quick coupling and uncoupling of the two belt parts, as will be apparent.

From a standpoint of quick coupling, it will be apparent that the coupling part 12 can also be directly coupled with any one of the loops 19, 20, 21, without disturbing the ends of the parts 11 and 12 where attached to the supports, as at 36. Here, it will be uderstood that the minute that 31 is detached from 32, the part 12 can be quickly removed from the loop 19, 20 or 21 which has been engaged by the part 12.

When it would not be objectionable to remove the part 12 from the several loops, it will be apparent that the part 12, in making an initial coupling, for example, with the loop 20, can also be passed through the loops 16 and 19 but, in detachment or uncoupling, the part 12 would have to be removed from the loops 20, 19 and, finally, the loop 16. This latter arrangement would keep the part 11 at all times in alinement with the part 12.

Having fully described my invention, what I claim as new and desire to secure by Letters Patent is:

1. A patient support belt comprising two separate body engaging belt parts, one part defining an adjustable part and the other part defining a coupling part, said adjustable part having longitudinally spaced elongated coupling loops secured to said adjustable part at spaced coupling stations, one of said loops being positioned at one end of the adjustable part, another loop being disposed at the other end of said adjustable part, said coupling part having means for attachment of one end thereof to a support, the other end portion of the coupling part being adapted to pass through one of the loops of the adjustable part, said last named end portion of the coupling part having interengaging means adjustably positioning the coupling part in the loop of the adjustable part engaged by said coupling part in properly positioning the belt upon the body of a patient, and the second named end loop and other loops of said adjustable part providing adjustable coupling of said adjustable part with respect to another support.

2. A support belt as defined in claim 1, wherein said first named means comprises a loop mounted in the first end of the coupling part, and said loop engaging the coupling part at said end portion in defining on the coupling part a support engaging ring portion.

3. A support belt as defined in claim 1, wherein said second named means comprises spaced male and female quick couplings arranged on one surface of one end portion of the coupling part, the male coupling engaging a relatively long female coupling intermediate end portions of said female coupling in providing adjustment of said coupling part.

4. A support belt as defined in claim 1, wherein the coupling part is engageable with two or more of the loops of the adjustable part in securing the belt in support position.

5. A support belt as defined in claim 1, wherein the first named belt part comprises a single webbing fashioned to form a belt part of two-ply thickness with spaced loop engaging and supporting stations, and one of said stations intermediate end loops of the adjustable belt part having the terminal ends of the webbing located adjacent said one station.

6. A support belt as defined in claim 5, wherein the coupling part comprises a single-ply webbing having a loop at one end, and said second named means comprising a short male coupling element at the other end portion of said coupling part, a long female coupling element spaced with respect to said male coupling element, and both of said coupling elements being disposed on one surface of the webbing of said coupling part primarily on the second named end portion of said part.

7. A support belt as defined in claim 1, wherein the coupling part comprises a single-ply webbing having a loop at one end, said second named means comprising a short male coupling element at the other end portion of said coupling part, a long female coupling element spaced with respect to said male coupling element, and both of said coupling elements being disposed on one surface of the webbing of said coupling part primarily on the second named end portion of said part.

8. A support belt as defined in claim 1, wherein said second named means comprises a Velcro closure comprising male and female coupling portions spaced longitudinally of one surface of said coupling part.

9. A support belt as defined in claim 1, wherein the coupling part is fashioned from a webbing of two-ply thickness throughout its length, and means including stitchings uniting the ply of the webbing of said coupling part and forming at the ends of said part and intermediate said ends of the stations for positioning the coupling loops on said part.

10. A support belt as defined in claim 9, wherein the major portion of the length of said coupling part comprises a single webbing, and said first named means including a loop fixed to the webbing.

References Cited by the Examiner

UNITED STATES PATENTS

| | | | |
|---|---|---|---|
| 310,180 | 1/1885 | Brundage | 297—385 |
| 1,991,633 | 2/1935 | Serpico | 297—385 X |
| 2,320,935 | 6/1943 | Johnstone | 297—385 |
| 2,383,918 | 8/1945 | Muller | 297—385 |
| 2,758,769 | 8/1956 | Nunn et al. | 297—389 |
| 2,878,981 | 3/1959 | Guido | 297—385 X |
| 2,904,347 | 9/1959 | Tucker | 297—385 X |
| 3,000,384 | 9/1961 | Piers | 132—46 |
| 3,057,354 | 8/1962 | Roberts et al. | 128—289 |
| 3,136,311 | 6/1964 | Lewis | 128—134 |
| 3,241,881 | 3/1966 | Carnahan et al. | 297—385 |

FRANK B. SHERRY, *Primary Examiner.*

JAMES T. McCALL, *Examiner.*